United States Patent
Fu et al.

(10) Patent No.: US 10,674,403 B2
(45) Date of Patent: Jun. 2, 2020

(54) TRAFFIC STEERING BETWEEN RADIO ACCESS NETWORK NODES

(71) Applicant: Telefonaktiebolaget LM Ericsson (publ), Stockholm (SE)

(72) Inventors: Jing Fu, Solna (SE); Åsa Bertze, Spånga (SE); Steven Corroy, Järfälla (SE); Selim Ickin, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 13 days.

(21) Appl. No.: 15/767,851

(22) PCT Filed: Nov. 20, 2015

(86) PCT No.: PCT/EP2015/077270
§ 371 (c)(1),
(2) Date: Apr. 12, 2018

(87) PCT Pub. No.: WO2017/084723
PCT Pub. Date: May 26, 2017

(65) Prior Publication Data
US 2018/0310203 A1    Oct. 25, 2018

(51) Int. Cl.
*H04W 28/08* (2009.01)
*G06N 20/00* (2019.01)
(Continued)

(52) U.S. Cl.
CPC .......... *H04W 28/085* (2013.01); *G06N 20/00* (2019.01); *H04W 24/08* (2013.01);
(Continued)

(58) Field of Classification Search
CPC ................................................. H04W 28/085
See application file for complete search history.

(56) References Cited

U.S. PATENT DOCUMENTS

2007/0064667 A1* 3/2007 Rensburg .............. H04L 1/0026
370/346
2014/0162626 A1   6/2014 Cui et al.
(Continued)

FOREIGN PATENT DOCUMENTS

WO    2015161817 A1    10/2015
WO    2015174799 A1    11/2015

OTHER PUBLICATIONS

International Search Report and Written Opinion dated Jul. 20, 2016 for International Application No. PCT/EP2015/077270 filed on Nov. 20, 2015, consisting of 8-pages.

*Primary Examiner* — John D Blanton
(74) *Attorney, Agent, or Firm* — Sage Patent Group

(57) ABSTRACT

There are provided mechanisms for traffic steering between a first radio access network node and a second radio access network node. A method is performed by a system. The method includes obtaining, for each of the first radio access network node and the second radio access network node, a respective predicted traffic throughput for a wireless device. The wireless device is in dual connectivity with the first radio access network node and the second radio access network node. The method includes determining splitting of transmission of a flow of data destined for the wireless device between the first radio access network node and the second radio access network node according to the obtained predicted traffic throughputs. The method includes initiating traffic steering of the flow of data between the first radio access network node and the second radio access network node according to the splitting.

18 Claims, 4 Drawing Sheets

(51) Int. Cl.
*H04W 76/15* (2018.01)
*H04W 24/08* (2009.01)
*H04L 12/26* (2006.01)

(52) U.S. Cl.
CPC .......... *H04W 76/15* (2018.02); *H04L 43/062* (2013.01); *H04L 43/0882* (2013.01); *H04W 28/08* (2013.01)

(56) References Cited

U.S. PATENT DOCUMENTS

| | | | |
|---|---|---|---|
| 2015/0085800 A1* | 3/2015 | Sivanesan ............. | H04W 76/38 370/329 |
| 2015/0244639 A1* | 8/2015 | Iordache ............. | H04L 47/2441 370/230 |
| 2015/0312831 A1* | 10/2015 | Sang ................ | H04W 36/0083 370/236 |
| 2015/0312947 A1* | 10/2015 | Park ..................... | H04L 5/0098 370/329 |
| 2016/0255675 A1* | 9/2016 | Van Lieshout ....... | H04L 1/1829 370/329 |
| 2016/0323158 A1* | 11/2016 | Hu ......................... | G06N 7/005 |
| 2016/0337909 A1* | 11/2016 | Cai .................... | H04W 36/0033 |
| 2018/0077606 A1* | 3/2018 | Godin ............... | H04W 28/0263 |
| 2018/0191635 A1* | 7/2018 | Karthikeyan ......... | H04L 45/302 |

* cited by examiner

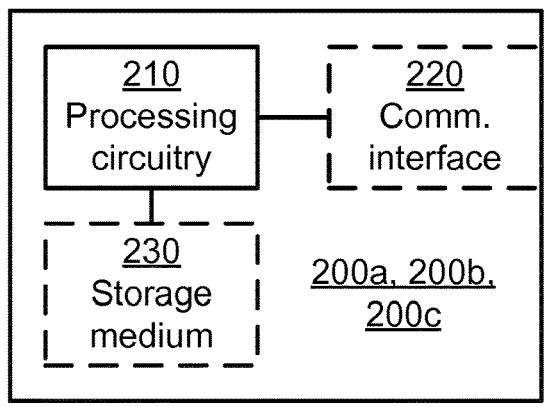
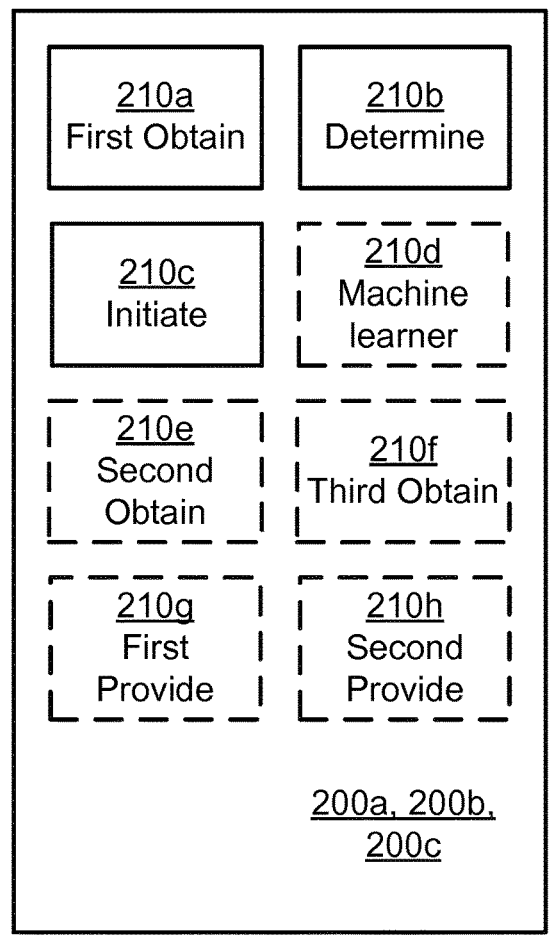
Fig. 2a
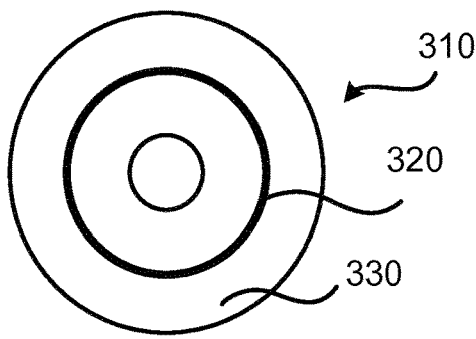
Fig. 3
Fig. 2b
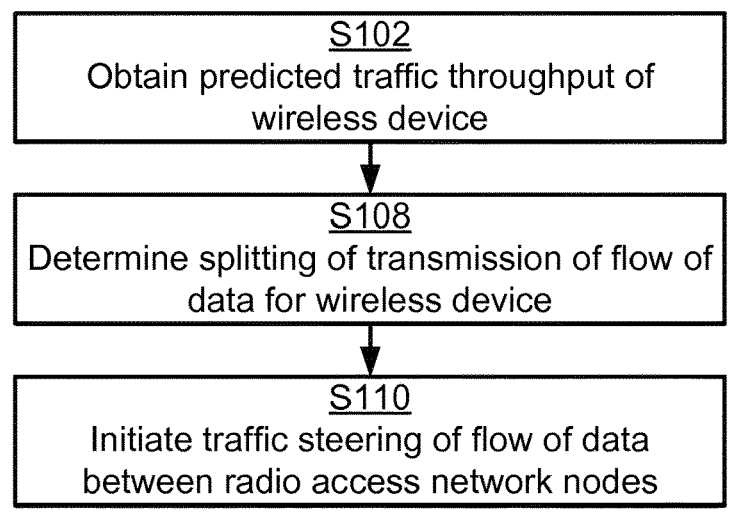
Fig. 4

TRAFFIC STEERING BETWEEN RADIO ACCESS NETWORK NODES

CROSS-REFERENCE TO RELATED APPLICATIONS

This application is a Submission Under 35 U.S.C. § 371 for U.S. National Stage Patent Application of International Application Number: PCT/EP2015/077270, filed Nov. 20, 2015 entitled "TRAFFIC STEERING BETWEEN RADIO ACCESS NETWORK NODES," the entirety of which is incorporated herein by reference.

TECHNICAL FIELD

Embodiments presented herein relate to a system, a method, a system, a computer program, and a computer program product for traffic steering between a first radio access network node and a second radio access network node.

BACKGROUND

In communications networks, there may be a challenge to obtain good performance and capacity for a given communications protocol, its parameters and the physical environment in which the communications network is deployed.

For example, some communications networks are enabled to provide dual connectivity. Details of dual connectivity for Release 12 (Rel-12) in the suite of Long Term Evolution (LTE) telecommunications systems are provided in 3GPP TR 36.842 which introduced the concept of Master eNB (MeNB) and Secondary eNB (SeNB), where eNB is short for evolved NodeB. Each eNB then represents a separate cell for the wireless device.

Dual connectivity can be defined as operation where a given wireless device consumes radio resources provided by at least two different network points (a MeNB and at least one SeNBs), where the MeNB and the at least one SeNB are operatively connected over a non-ideal backhaul, implying that the MeNB and the at least one SeNB may only exchange information with a latency too large for joint resource scheduling. Moreover the MeNB and the at least one SeNB are assumed to use individual (i.e., separate) frequency carriers.

The performance of the communications network can be assumed to depend on how much data each eNB (MeNB as well as SeNB) receive from the serving gateway (SGW) of the wireless device in the communications network to transmit to the wireless device. One challenge with dual connectivity is to schedule resources for a specific wireless device on the frequency carriers of the MeNB and the at least one SeNB without being able to synchronize or exchange information in real time.

In comparison, in a communications network based on single cells, the serving gateway (SGW) of the wireless device transmits all downlink traffic for the wireless device to one eNB, i.e., the serving eNB. The serving eNB then schedules the wireless device and transmits the traffic downlink to the wireless device. However, as disclosed above, with dual connectivity, there could be more than one eNB serving the wireless device. In this case, the serving gateway may need to decide how to steer the traffic to the wireless device to two or more eNBs.

Two examples of splitting transmission of a flow of data destined for the wireless device between the MeNB and one SeNB in a dual connectivity scenario will be summarized next.

According to a first example the complete flow of data is split at the SGW. Part of the data for the wireless device is sent to the MeNB and the rest to the SeNB. Each eNB then transmits its flow of data on its own frequency carrier to the wireless device. The wireless device thereby receives the flow of data on two frequency carriers and can rebuild the complete flow of data.

According to a second example the complete flow of data is sent to the MeNB representing the serving eNB of the wireless device. The MeNB performs the split of the flow of data, whereby the MeNB keeps a share of the data and forwards the rest of the data to the SeNB. Each eNB then transmits its flow of data on its own frequency carrier to the wireless device. The wireless device thereby receives the flow of data on two frequency carriers and can rebuild the complete flow of data.

Two mechanism for splitting the flow of data between the eNBs in a dual connectivity enabled communications network, and potential drawbacks related thereto, will be summarized next.

According to a first example, equal splitting is performed, whereby each eNB is provided the same amount of data in the flow of data for the wireless device. However, if one of the eNBs is overloaded, this eNB will not be able to process its share of the data as fast as the other eNB(s) and the wireless device may experience a large delay.

According to a second example, the splitting is based on throughput and feedback. Each eNB is first provided some part of the total amount of data. Then each eNB feeds back its current throughput to the SGW (or the serving eNB). Then the eNB with the highest throughput is iteratively and gradually provided more data to transmit to the wireless device. However, if the wireless device is physically moving when receiving the flow of data, its current throughput does not necessarily reflect at all its future throughput. Similarly, if the conditions in a cell served by one of the eNBs change quickly (such as many new wireless devices entering the cell) the load of this one eNB can change drastically. Moreover the feedback interfaces are comparatively slow so that even if the conditions change only slowly, the feedback may arrive so late at the SGW that the current throughput is outdated and possibly incorrect. This can lead to yoyo effects where a wireless device, that is located at a cell border and receives a large amount of data from an eNB having poor performance, and that reports back poor traffic throughput, in the mean time moves towards the cell center and once in the cell center has a small amount of data to be delivered to it.

US 2015/0215945 A1 discloses mechanisms for enhancing wireless device buffer state reporting and logical channel prioritization procedures to communicate and manage multiple schedulers from different base stations in a dual connectivity system. Buffer status values are determined based on an allocation rule and a determined amount of available data for transmission. The mechanisms in US 2015/0215945 A1 are disclosed to be implemented by the wireless device and hence leave open how to handle traffic steering from the network side.

Hence, there is still a need for an improved traffic steering in dual connectivity enabled communications networks.

SUMMARY

An object of embodiments herein is to provide efficient traffic steering in dual connectivity enabled communications networks.

According to a first aspect there is presented a system for traffic steering between a first radio access network node and a second radio access network node. The system comprises processing circuitry. The processing circuitry is configured to cause the system to obtain, for each of the first radio access network node and the second radio access network node, a respective predicted traffic throughput for a wireless device. The wireless device is in dual connectivity with the first radio access network node and the second radio access network node. The processing circuitry is configured to cause the system to determine splitting of transmission of a flow of data destined for the wireless device between the first radio access network node and the second radio access network node according to the obtained predicted traffic throughputs. The processing circuitry is configured to cause the system to initiate traffic steering of the flow of data between the first radio access network node and the second radio access network node according to the splitting.

According to a second aspect there is presented a system for traffic steering between a first radio access network node and a second radio access network node. The system comprises processing circuitry. The system comprises a computer program product. The computer program product stores instructions that, when executed by the processing circuitry, causes the system to perform a set of operations, or steps. The operations comprise obtaining, for each of the first radio access network node and the second radio access network node, a respective predicted traffic throughput for a wireless device. The wireless device is in dual connectivity with the first radio access network node and the second radio access network node. The operations comprise determining splitting of transmission of a flow of data destined for the wireless device between the first radio access network node and the second radio access network node according to the obtained predicted traffic throughputs. The operations comprise initiating traffic steering of the flow of data between the first radio access network node and the second radio access network node according to the splitting.

According to a third aspect there is presented a system for traffic steering between a first radio access network node and a second radio access network node. The system comprises an obtain module configured to obtain, for each of the first radio access network node and the second radio access network node, a respective predicted traffic throughput for a wireless device. The wireless device is in dual connectivity with the first radio access network node and the second radio access network node. The system comprises a determine module configured to determine splitting of transmission of a flow of data destined for the wireless device between the first radio access network node and the second radio access network node according to the obtained predicted traffic throughputs. The system comprises an initiate module configured to initiate traffic steering of the flow of data between the first radio access network node and the second radio access network node according to the splitting.

According to a fourth aspect there is presented a method for traffic steering between a first radio access network node and a second radio access network node. The method is performed by a system. The method comprises obtaining, for each of the first radio access network node and the second radio access network node, a respective predicted traffic throughput for a wireless device. The wireless device is in dual connectivity with the first radio access network node and the second radio access network node. The method comprises determining splitting of transmission of a flow of data destined for the wireless device between the first radio access network node and the second radio access network node according to the obtained predicted traffic throughputs. The method comprises initiating traffic steering of the flow of data between the first radio access network node and the second radio access network node according to the splitting.

According to a fifth aspect there is presented a computer program for traffic steering between a first radio access network node and a second radio access network node, the computer program comprising computer program code which, when run on a system, causes the system to perform a method. The method comprises obtaining, for each of the first radio access network node and the second radio access network node, a respective predicted traffic throughput for a wireless device. The wireless device is in dual connectivity with the first radio access network node and the second radio access network node. The method comprises determining splitting of transmission of a flow of data destined for the wireless device between the first radio access network node and the second radio access network node according to the obtained predicted traffic throughputs. The method comprises initiating traffic steering of the flow of data between the first radio access network node and the second radio access network node according to the splitting.

According to a sixth aspect there is presented a computer program product comprising a computer program according to the fifth aspect and a computer readable storage medium on which the computer program is stored. The computer readable storage medium can be a non-transitory computer readable storage medium.

Advantageously these systems, this method, this computer program and this computer program product provides efficient traffic steering of the flow of data for the wireless device between the first radio access network node and the second radio access network node.

It is to be noted that any feature of the first, second, third, fourth, fifth and sixth aspects may be applied to any other aspect, wherever appropriate. Likewise, any advantage of the first aspect may equally apply to the second, third, fourth fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 2a is a schematic diagram showing functional units of a system according to an embodiment;

FIG. 2b is a schematic diagram showing functional modules of a system according to an embodiment;

FIG. 3 shows one example of a computer program product comprising computer readable storage medium according to an embodiment;

FIGS. 4 and 5 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
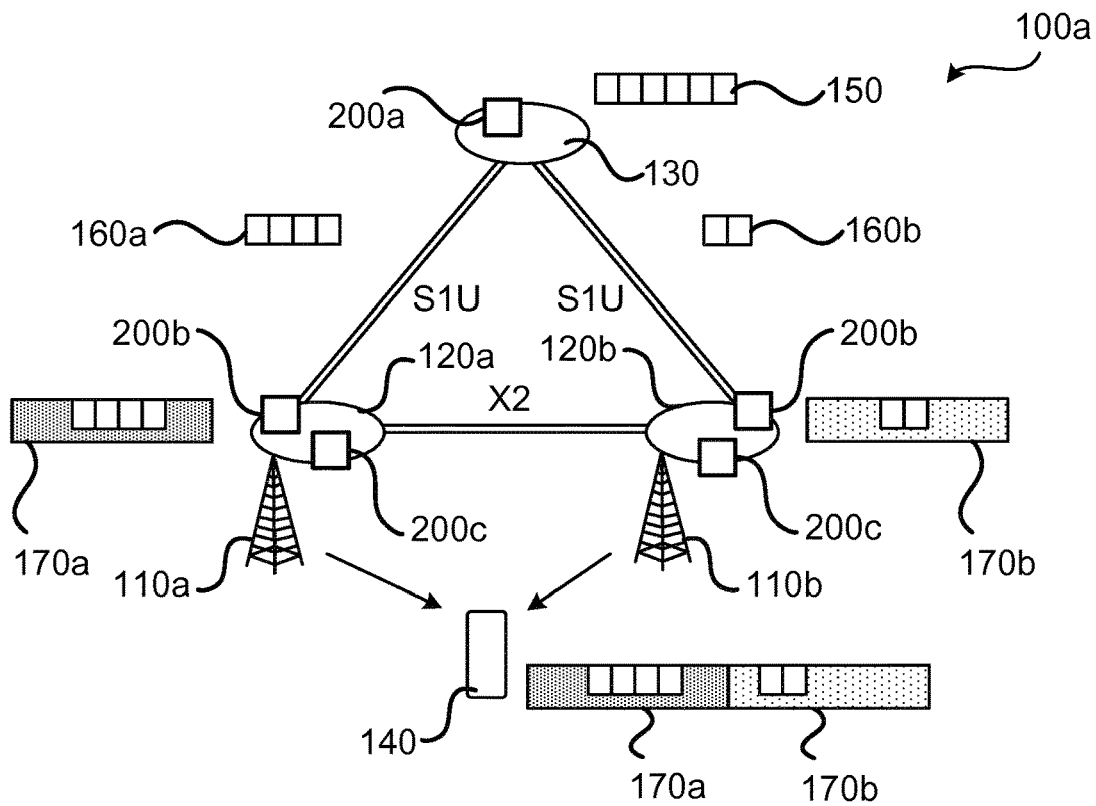
FIGS. 1a and 1b are schematic diagrams illustrating communications networks according to embodiments.
Figure 1B:
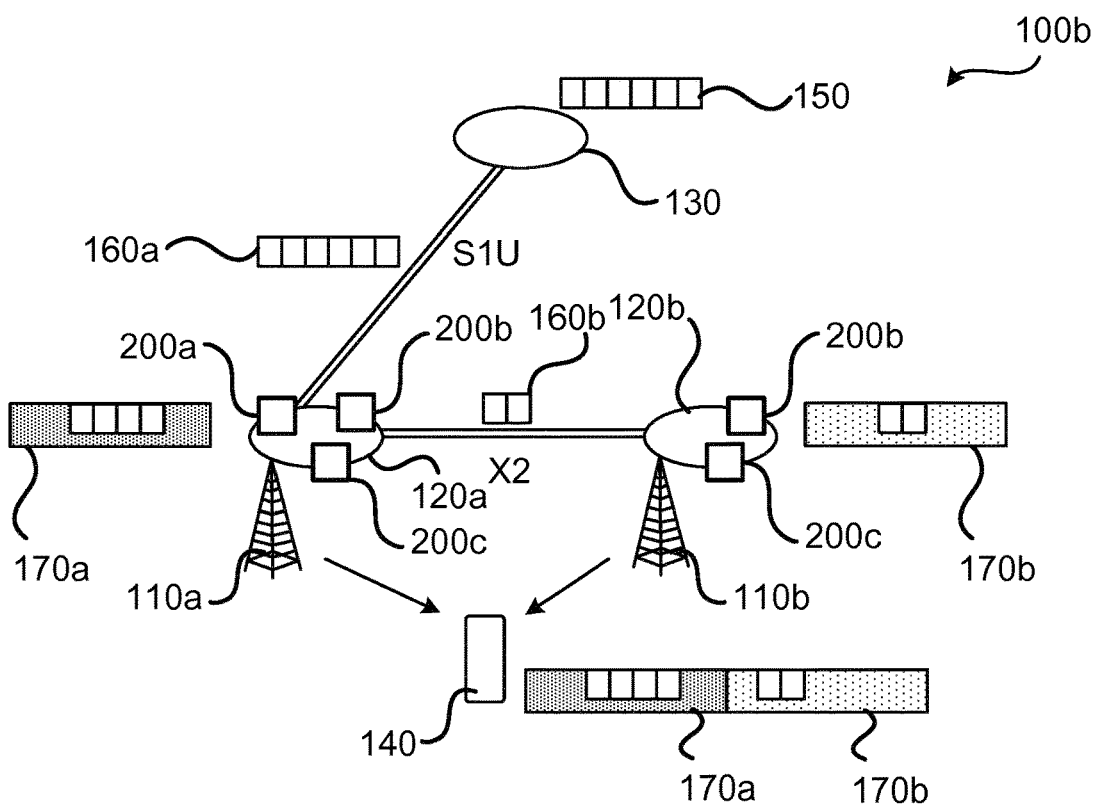

FIG. 1*a* is a schematic diagram illustrating a communications network 100*a* where embodiments presented herein can be applied. FIG. 1*b* is a schematic diagram illustrating a communications network 100*b* where embodiments presented herein can be applied.

The communications networks 100*a*, 100*b* comprise radio access network nodes 110*a*, 110*b* providing network access to a wireless device 140. Radio access network node 100*a* will hereinafter be denoted a first radio access network node 100*a* and radio access network node 100*b* will hereinafter be denoted a second radio access network node 110*b*. The first radio access network node 110*a* and the second radio access network node 100*b* could be implemented in a respective radio base station, base transceiver station, or access point, or any future corresponding radio access network node imaginable by the person skilled in the art at this stage, e.g. in view of the 3GPP fifth generation standardization work that is ongoing.

Each radio access network node 110*a*, 110*b* is associated with a respective network node 120*a*, 120*b*. The network node 120*a* associated with the first radio access network node 100*a* will hereinafter be denoted a first network node 120*a*, and the network node 120*b* associated with the second radio access network node 110*b* will hereinafter be denoted a second network node 120*b*

The first network node 120*a* and the second network node 120*b* could be implemented in a respective node B, evolved node B, or access point, or any future corresponding network node imaginable by the person skilled in the art at this stage, e.g. in view of the 3GPP fifth generation standardization work that is ongoing.

From a network architecture point of view, the network nodes 120*a*, 120*b* may be regarded as logical entities whereas the radio access network nodes 110*a*, 100*b* may be regarded as physical entities.

The wireless device 140 may be a portable wireless device, a mobile station, a mobile phone, a handset, a wireless local loop phone, a user equipment (UE), a mobile equipment, a smartphone, a laptop computer, a tablet computer, a wireless modem, or a sensor device. It may also be a more stationary device such as a telematics unit embedded in or attachable to a vehicle, such as a car, truck, bus, boat, train, airplane and flying drone. The wireless device 140 may also for example be embedded in or attachable to a domestic appliance, such as in white goods, door locks, surveillance and alarm equipment and autonomous vacuum cleaners and grass cutters. The wireless device 140 may of course also be embedded in or attachable telematics units for robots and 3D printers used for industrial purposes or for domestic support functions. Other examples of where the wireless device 140 may be incorporated or added to is in public service equipment, such as street lamps, surveillance cameras, entrance admittance equipment for public transport. The wireless device 140 may in other words be or be implemented in equipment which is able to utilize the wireless connectivity to the communications networks 100*a*, 100*b*. Further examples of such wireless devices 140 are equipment used in healthcare and in payment terminals, e.g. payment terminals for credit cards.

The communications networks 100*a*, 100*b* further comprise a serving gateway 130. At the serving gateway 130 is schematically illustrated a flow of data 150 to be delivered to the wireless device 140. A first part 160*a* of the data 150 is forwarded to the first network node 120*a* and a second part 160*b* of the data 150 is forwarded to the second network node 120*b* over interface S1U; note here that in the communications network 100*b* the first part 160*a* comprises the complete flow of data 150, and the second part 160*b* is forwarded from the first network node 120*a* the second network node 120*b* over interface X2. The first part 160*a* of the data 150 is transmitted from the first radio access network node 110*a* the wireless device 140 using a first frequency carrier 170*a*. The second part 160*b* of the data 150 is transmitted from the second radio access network node 100*b* to the wireless device 140 using a second frequency carrier 170*b*. The wireless device 140 then receives the complete flow of data by extracting the first part 160*a* of the data 150 from the first frequency carrier 170*a* and extracting the second part 160*b* of the data 150 from the second frequency carrier 170*b*.

The communications networks 100*a*, 100*b* further comprise a traffic steering module 200*a*, at least one traffic throughput prediction module 200*b*, and at least one buffer length reporting module 200*c*. In the communications network 100*a* the traffic steering module 200*a* may be co-located with, reside in, or at least operatively connected to, the serving gateway 130. In the communications network 100*b* the traffic steering module 200*a* may be co-located with, reside in, or at least operatively connected to, the first network node 120*a*. One traffic throughput prediction module 200*b* may be co-located with, reside in, or at least operatively connected to, one network node 120*a*, 120*b*. One buffer length reporting module 200*c* may be co-located, or at least operatively connected to, one network node 120*a*, 120*b*.

In the communications network 100*a*, where the traffic steering module 200*a* may be co-located with, reside in, or at least operatively connected to, the serving gateway 130, the traffic steering module 200*a* communicates with the traffic throughput prediction module 200*b* and the buffer length reporting module 200*c* over the S1U interface. In the communications network 100*b*, where the traffic steering module 200*a* may be co-located with, reside in, or at least operatively connected to, the first network node 120*a*, the traffic steering module 200*a* communicates with the traffic throughput prediction module 200*b* of the second network node 120*b* and the buffer length reporting module 200*c* of the second network node 120*b* over the X2 interface.

Figure 6:
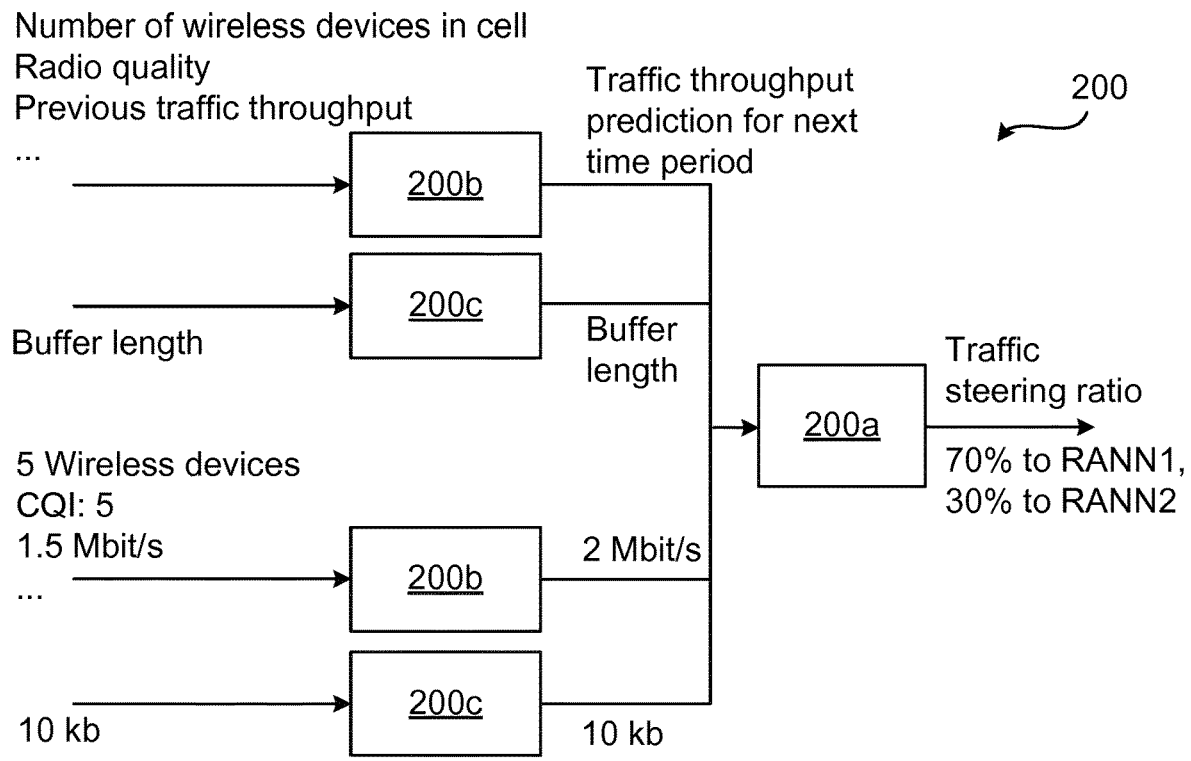
FIG. 6 schematically illustrates a block diagram of a system according to an embodiment.

At least the traffic steering module 200*a* defines a system 200 (see, FIG. 6). According to some embodiments the system 200 further comprises at least one traffic throughput prediction module 200b. According to some embodiments the system 200 further comprises at least one buffer length reporting module 200c.

The embodiments disclosed herein generally relate to splitting the flow of data 150 to be delivered to the wireless device 140 between the first network node 120a and the second network node 120b for delivery to the wireless device from the first radio access network node 110a and the second radio access network node 100b when the wireless device 140 is in dual connectivity with the first radio access network node 110a and the second radio access network node 100b.

The embodiments disclosed herein thus generally relate to traffic steering between a first radio access network node 110a and a second radio access network node 100b. In order to obtain such traffic steering there is provided a system 200, 200a, 200b, 200c, a method performed by the system 200, 200a, 200b, 200c, a computer program product comprising code, for example in the form of a computer program, that when run on a system 200, 200a, 200b, 200c, causes the system 200, 200a, 200b, 200c perform the method.

Figure 5:
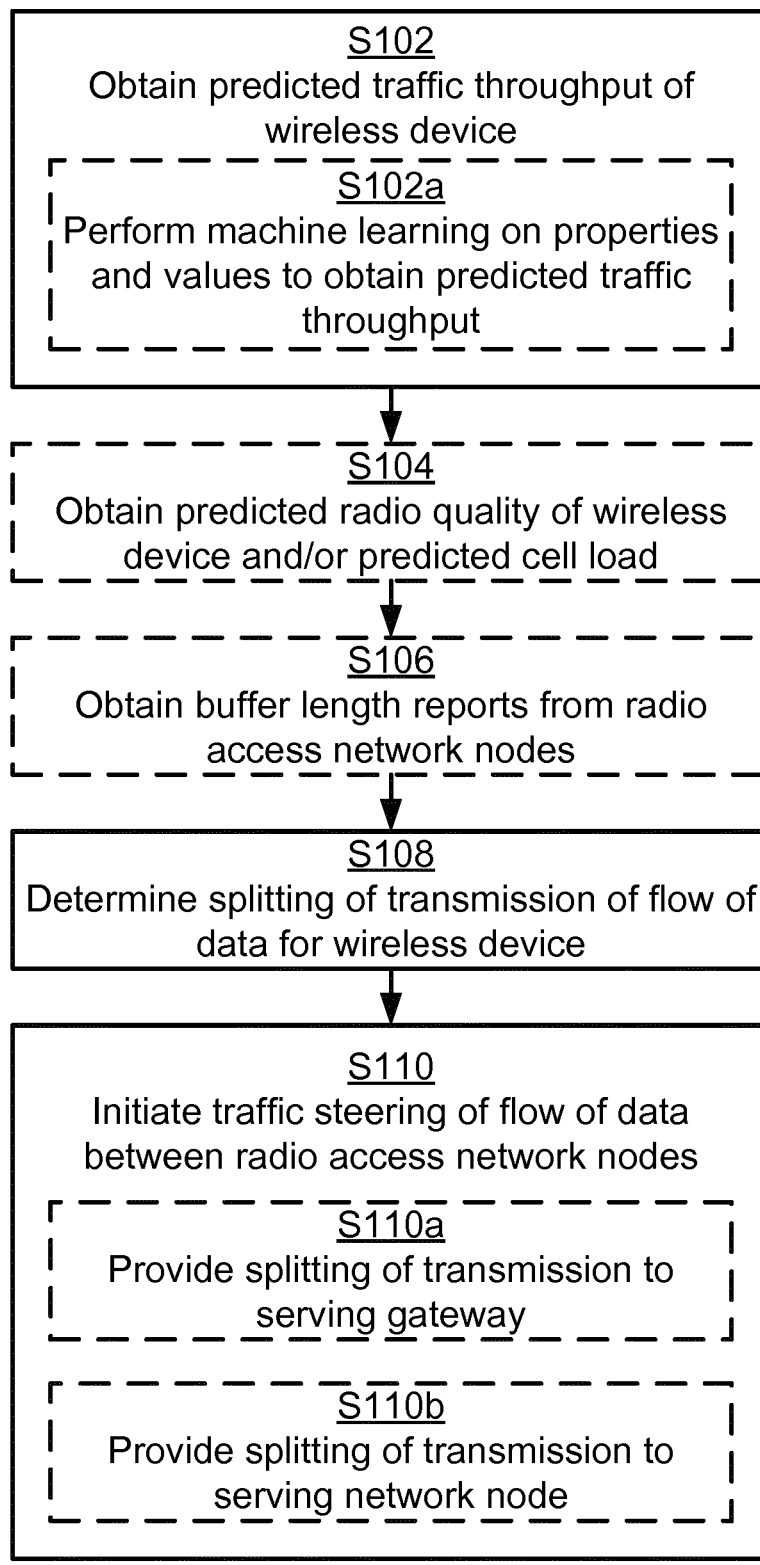

FIGS. 4 and 5 are flow chart illustrating embodiments of methods for traffic steering between a first radio access network node 110a and a second radio access network node 100b. The methods are performed by the system 200, 200a, 200b, 200c. The methods are advantageously provided as computer programs 320.

Reference is now made to FIG. 4 illustrating a method for traffic steering between a first radio access network node 110a and a second radio access network node 100b as performed by the system 200, 200a, 200b, 200c according to an embodiment. The traffic steering is performed for a wireless device 140 being in dual connectivity with the first radio access network node 110a and the second radio access network node 100b.

The traffic steering is based on predicted traffic throughput for the wireless device 140. Hence, the system 200, 200a, 200b, 200C is configured to perform step S102:

S102: The system 200, 200a, 200b, 200C obtains, for each of the first radio access network node 100a and the second radio access network node 100b, a respective predicted traffic throughput for the wireless device 140.

It is assumed that a flow of data is to be transmitted to the wireless device 140. Hence, the system 200, 200a, 200b, 200C is configured to perform step S108:

S108: The system 200, 200a, 200b, 200c determines splitting of transmission of the flow of data destined for the wireless device 140. The splitting of transmission is made between the first radio access network node 110a and the second radio access network node 100b. The splitting of transmission is determined according to the obtained predicted traffic throughputs.

The system 200, 200a, 200b, 200C then uses the determined splitting of transmission of the flow of data destined for the wireless device 140 to initiate traffic steering. Hence, the system 200, 200a, 200b, 200C is configured to perform step S110:

S110: The system 200, 200a, 200b, 200c initiates traffic steering of the flow of data between the first radio access network node 100a and the second radio access network node 100b according to the splitting (i.e., the splitting as determined in step S108).

The act of initiating traffic steering is thereby triggered by the result, i.e., the splitting of the transmission of the flow of data destined for the wireless device 140, as determined in step S108. This determined splitting thus serves as ground for the traffic steering. In this respect, the system 200, 200a, 200b, 200c does by itself not need to implement, or perform, the actual traffic steering, but only to initiate the traffic steering. Embodiments of how the traffic steering can be initiated will be disclosed below with reference to steps S110a and S110b.

Embodiments relating to further details of traffic steering between a first radio access network node 100a and a second radio access network node 100b will now be disclosed.

Although splitting in step S108 is determined between the first radio access network node 110a and the second radio access network node 110b, this does not exclude the splitting to be performed between the first radio access network node 100a and at least two second radio access network nodes 110b. Therefore, respective predicted traffic throughput for the wireless device 140 may be obtained for the first radio access network node 110a and at least two second radio access network nodes 110b.

There may be different examples of data destined for the wireless device 140. For example, the data destined for the wireless device 140 can represent packet data convergence protocol (PDCP) packet data units (PDUs). Hence, the flow of data may be a flow of PDCP PDUs.

There may be different ways for the first radio access network node 110a and the second radio access network node 110b communicate with the wireless device 140 in the dual connectivity enabled communications network too. For example, each of the first radio access network node 100a and the second radio access network node 100b can use its own frequency carrier.

Properties of the traffic throughput prediction module 200b will now be disclosed in detail. Generally, the traffic throughput prediction module 200b is configured to predict traffic throughputs per individual wireless device 140.

There may be different examples of what the predicted traffic throughput represents. For example, the predicted traffic throughput can be related to transmission resources to be made available to the wireless device 140.

Particularly, according to an embodiment the predicted traffic throughput for the wireless device 140 from one of the first radio access network node 110a and the second radio access network node 110b represents the amount of transmission resources to be made available to the wireless device 140 from this one of the first radio access network node 100a and the second radio access network node 100b.

There may be different ways for the system 200, 200a, 200b, 200c obtain the predicted traffic throughputs. In this respect, the traffic steering module 200a may obtain the predicted traffic throughputs from the traffic throughput prediction module 200b. For example, the predicted traffic throughputs can be obtained from respective measures of current traffic throughputs at the first radio access network node 100a and the second radio access network node 110b. Hence the traffic throughput prediction module 200b can be configured to predict the traffic throughputs from these respective measures of current traffic throughputs.

The predicted traffic throughput for the wireless device 140 can be based on a set of properties and historical values, also denoted instances, thereof. The historical values are obtained by the first radio access network node 100a and the second radio access network node 100b. There are different examples of properties that could be included in the set of properties. For example, the set of properties can comprise the total number of wireless devices 140 served by the first radio access network node 100a and the second radio access network node 100b, the number of active wireless devices 140 served by the first radio access network node 100a and the second radio access network node 110b, channel quality information of each wireless devices 140 served by the first radio access network node 100*a* and the second radio access network node 110*b*, antenna rank of each wireless device 140 served by the first radio access network node 100*a* and the second radio access network node 100*b*, wireless device throughput of the first radio access network node 100*a* and the second radio access network node 100*b*, cell load of the first radio access network node 100*a* and the second radio access network node 100*b*, the number of used frequency sub-bands at the first radio access network node 100*a* and the second radio access network node 110*b*, and/or frequency of scheduling for each wireless device 140 served by the first radio access network node 100*a* and the second radio access network node 110*b*. Numerical examples of how at least some of these properties may be used to determine splitting of transmission of the flow of data destined for the wireless device 140 will be provided below.

Reference is now made to FIG. 5 illustrating methods for traffic steering between a first radio access network node 110*a* and a second radio access network node 100*b* as performed by the system 200, 200*a*, 200*b*, 200*c* according to further embodiments. It is assumed that steps S102, S108, S110 are performed as disclosed above.

Machine learning can be used on the set of properties and the values thereof in order to obtain the predicted traffic throughputs. Hence, according to an embodiment the system 200, 200*a*, 200*b*, 200*c* is configured to perform step S102*a*:

S102*a*: The system 200, 200*a*, 200*b*, 200*c* performs machine learning on the set of properties and the values thereof in order to obtain the predicted traffic throughputs.

Step S102*a* may be performed as part of above disclosed step S102.

Machine learning mechanisms such as random forest, logistic regression, and neural networks can be used to obtain the predicted traffic throughputs. Such machine learning mechanisms can further be used to construct models to predict future cell load and radio quality. Hence, according to an embodiment the system 200, 200*a*, 200*b*, 200*c* is configured to perform step S104:

S104: The system 200, 200*a*, 200*b*, 200*c* obtains at least one of a predicted radio quality of the wireless device 140 and predicted cell load from each of the first radio access network node 100*a* and the second radio access network node 100*b*. The splitting of transmission of the flow of data as disclosed in step S108 is then determined according to the obtained predicted radio quality and/or predicted cell load in addition to the obtained predicted traffic throughputs.

Properties of the buffer length reporting module 200*c* will now be disclosed in detail. Generally, the buffer length reporting module 200*c* is configured to report current buffer lengths of the wireless device 140 to the traffic steering module 200*a*. Therefore, according to an embodiment the system 200, 200*a*, 200*b*, 200*c* is configured to perform step S106:

S106: The system 200, 200*a*, 200*b*, 200*c* obtains a respective buffer length report for the wireless device 140 from each of the first radio access network node 100*a* and the second radio access network node 110*b*. The splitting of transmission of the flow of data as disclosed in step S108 is then determined according to the obtained buffer length reports in addition to the obtained predicted traffic throughputs.

The system 200, 200*a*, 200*b*, 200*c* then initiates traffic steering of the flow of data as in step S100. There may be different ways for the system 200, 200*a*, 200*b*, 200*c* initiate this traffic steering. Two embodiments relating thereto will now be disclosed. For example, as disclosed above (as in the communications network 100*a* of FIG. 1*a*) the flow of data may be split at the serving gateway 130. Hence, according to a first embodiment the system 200, 200*a*, 200*b*, 200*c* is configured to perform step S110*a*:

S110*a*: The system 200, 200*a*, 200*b*, 200*c* provides the splitting of transmission of the flow of data to a serving gateway 130 of the wireless device 140 when initiating traffic steering of the flow of data.

Step S110*a* may be performed as part of above disclosed step S110.

Alternatively, as also disclosed above (as in the communications network 100*b* of FIG. 1*b*) the flow of data may be split at the first network node 120*a* acting as a serving network node 120*a* of the wireless device 140. Hence, according to a second embodiment the system 200, 200*a*, 200*b*, 200C is configured to perform step S110*b*:

S110*b*: The system 200, 200*a*, 200*b*, 200*c* provides the splitting of transmission of the flow of data to the serving network node 120*a* of the wireless device 140 when initiating traffic steering of the flow of data.

Step S100*b* may be performed as part of above disclosed step S110.

FIG. 6 is a block diagram of a system 200 comprising a traffic steering module 200*a*, two traffic throughput prediction modules 200*b*, and two buffer length reporting modules 200*c*. For the upper-most traffic throughput prediction module 200*b* and buffer length reporting module 200*c* properties of the input and output parameters are given; the traffic throughput prediction module 200*b* receives the number of wireless devices in the cell, the radio quality of the wireless devices in the cell, and previous traffic throughput for the wireless device as inputs and provides a traffic throughput prediction as output; and the buffer length reporting module 200*c* receives buffer length of the wireless device as input and provides buffer length of the wireless device as output. For the lower-most traffic throughput prediction module 200*b* and buffer length reporting module 200*c* example numerical values of these properties are given. That is, the number of wireless devices in the cell associated with the lower-most traffic throughput prediction module 200*b* is 5, the radio quality, in terms of channel quality indication (CQI) level, of the wireless devices in the cell associated with the lower-most traffic throughput prediction module 200*b* is 5, and the previous traffic throughput for the wireless device associated with the lower-most traffic throughput prediction module 200*b* is 1.5 Mbit/s. Further, the buffer length of the wireless device associated with the lower-most buffer length reporting module 200*c* is 10 kb. The traffic steering module 200*a* receives the output from the two traffic throughput prediction modules 200*b* and the two buffer length reporting modules 200*c* and determines splitting of transmission of the flow of data destined for the wireless device 140 between the first radio access network node 100*a* and the second radio access network node 100*b* according to the obtained output from the two traffic throughput prediction modules 200*b* and the two buffer length reporting modules 200*c*. According to the illustrative numerical example, 70% of the flow of data destined for the wireless device 140 is forwarded to the first radio access network node 110*a* (RANN1) whilst the remaining 30% is forwarded to the second radio access network node 100*b*. Thus, this specific traffic steering ratio is affected by the traffic throughput predictions and the buffer lengths in a certain way such that the final result is 70%/30%. Further numerical examples of how to arrive at the determined splitting will be presented below with references to Tables 1 and 2.

The traffic throughput prediction module 200b and the buffer length reporting module 200c may continuously provide information to the traffic steering module 200a such that the traffic steering module 200a can perform optimal traffic steering. In this respect, the traffic throughput prediction module 200b and the buffer length reporting module 200c may continuously provide information to the traffic steering module 200a in irregular or regular time intervals, for example every 1 second, every 5 seconds, or every 10 seconds. Hence, the traffic steering module 200a can determine a new splitting of the transmission as in step S108 and a new initiation of the traffic steering as in step S110 at these time intervals.

Moreover, messages from the traffic throughput prediction module 200b can include predicted traffic throughput for the wireless device 140 for the near future for different time periods. Hence, each predicted traffic throughput can be associated with a duration in time, and wherein the predicted traffic throughputs are obtainable for time periods having at least two different durations in time. In this respect, the traffic steering module 200a can determine a new splitting of the transmission at a regular time interval as specified above (such as a new splitting of the transmission every 5 seconds), but also obtain information from the traffic throughput prediction module 200b and/or the buffer length reporting module 200c that is valid for a longer timer interval (such a s predicted traffic throughput for 1 hour) if the traffic steering module 200a, for some reason, misses to obtain information from the traffic throughput prediction module 200b and/or the buffer length reporting module 200c, the traffic steering module 200a may then use the information from the traffic throughput prediction module 200b and/or the buffer length reporting module 200c that is valid for the longer timer interval in order to determine the new splitting of the transmission.

Figure 7:
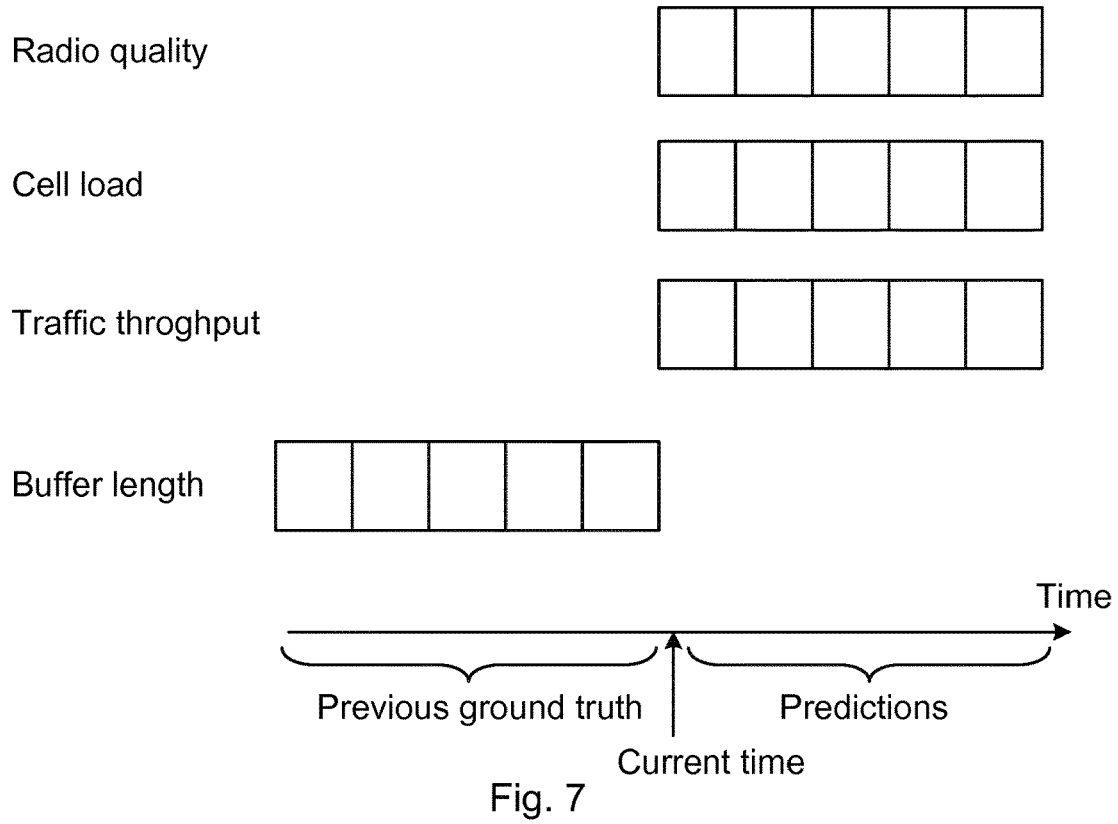
FIG. 7 schematically illustrates message passing from a traffic throughput prediction module to a traffic steering module.

FIG. 7 shows an example message passing from the traffic throughput prediction module 200b the traffic steering module 200a. The message passing includes traffic throughput prediction for the wireless device for the next five seconds (with a separate prediction for each one of these five seconds) based on the total number of wireless devices 140 served by each radio access network node 110a, 110b, current radio quality of the wireless device 140, and cell load. In this case, the traffic throughput prediction module 200b needs to send a new prediction every five seconds to the traffic steering module 200a. In addition to messages about predictions from the traffic throughput prediction module 200b, the buffer lengths reporting module 200c may send the current and previous buffer lengths for the wireless device. This information can be used to determine the ground truth for the splitting determined by the traffic steering module 200a.

The message passing can be performed more frequently if the traffic throughput prediction module 200b and/or the traffic steering module 200a detects significant changes in the traffic throughput predictions for the wireless device 140. Hence, according to an embodiment, how often the system 200, 200a, 200b, 200c obtains the predicted traffic throughput is dependent on a change of rate of traffic throughput between a first occurrence of obtained predicted traffic throughputs and a second occurrence of obtained predicted traffic throughputs.

As a non-limiting illustrative example, assume that each prediction period is 5 seconds, and that each radio access network node 110a, 110b predicts a traffic throughput of 4 Mbit/s for the next 5 seconds, and that each radio access network node 110a, 110b has an empty buffer for the wireless device 140. The traffic steering module 200a would then split the transmission of the flow of data destined for the wireless device 140 equally (i.e., 50%/50%) between the first radio access network node 100a and the second radio access network node 110b. Assume further that, after one second, the first radio access network node 110a provides an updated prediction for the remaining of 4 seconds, where the updated prediction indicates that the first radio access network node 110a predicts a traffic throughput of only 1 Mbit/s. The traffic steering module 200a could then update the splitting to 20%/80% for the remaining 4 seconds. As noted above, the radio access network nodes 110a, 110b should only provide these irregular updates if a significant change is detected; otherwise one prediction should be provided for each nominal time period (such as every 5 seconds).

Current and previous buffer lengths for a particular wireless device 140 can be used to determine the ground truth for the traffic splitting performed by the traffic steering module 200a. Hence, the buffer length reports as obtained in step S106 can indicate current and previous buffer lengths of the wireless device 140.

For example, if the traffic steering module 200a is configured to split the traffic between at least two radio access network nodes 110a, 100b, and sometime later, one of the at least two radio access network nodes 110a, 100b reports a zero buffer length, whilst another of the at least two radio access network nodes 110a, 100b reports a rather high buffer length, this would suggests that the traffic steering module 200a has not determined the splitting optimally if the goal is to roughly equate and minimize the buffer lengths at the at least two radio access network nodes 110a, 100b.

Further properties of the traffic steering module 200a will now be disclosed in detail. Generally, the traffic steering module 200a is configured to determine the splitting of the transmission of the flow of data destined for the wireless device 140, based on input messages from the traffic throughput prediction module 200b, and potentially from the buffer length reporting module 200c.

Three embodiments for how to determine the splitting of transmission of the flow of data to the first radio access network node 100a and the second radio access network node 100b will now be disclosed.

According to a first embodiment the splitting of transmission of the flow of data to the first radio access network node 100a and the second radio access network node 100b is determined to be proportional to the obtained predicted traffic throughputs for the first radio access network node 100a and the second radio access network node 100b. In more detail, according to this first embodiment the traffic steering module 200a could just split the flow of data according to the predicted traffic throughput for the different radio access network nodes. As a non-limiting illustrative example, assume that the first radio access network node 100a predicts the traffic throughput of the wireless device 140 to be 2 Mbit/s, and that the second radio access network node 100b predicts the traffic throughput of the wireless device 140 to be 3 Mbit/s, then the traffic steering module 200c should split the flow of data such that 40% of the data is forwarded to the first radio access network node 110a and 60% of the data is forwarded to the second radio access network node 100b.

According to a second embodiment the splitting of transmission of the flow of data to the first radio access network node 100a and the second radio access network node 100b is determined according to the obtained buffer length reports such that buffers at the first radio access network node 100a and the second radio access network node 100b for transmitting the flow of data destined for the wireless device 140 empty within a predetermined time period from each other. In more detail, according to this second embodiment, a heuristics-based traffic steering can be used. With such a heuristics-based approach, both bandwidth prediction and buffer length report can be used. According to a non-limiting illustrative example assume that the first radio access network node 100a predicts the traffic of the wireless device 140 to be 2 Mbit/s and currently buffers 120 kB data for the wireless device 140, whilst the second radio access network node 110b predicts the traffic of the wireless device 140 to be 3 Mbit/s and currently does not buffer any data for the wireless device 140. Then, one heuristics is to perform the splitting such that more than 60% of the flow of data for the wireless device 140 is directed to the second radio access network node 100b since first radio access network node 110a has a comparatively high buffer length.

Continued disclosure of the above non-limiting illustrating example of how to determine the splitting based on heuristics will now follow. A data amount of 120 kB roughly corresponds to 1 Mbit of data. If the splitting is determined at each second, the first radio access network node 110a can actually only handle 2 Mbit−1 Mbit=1 Mbit in the next second, whilst the second radio access network node 100b can handle 3 Mbit for the next second. Therefore, the ratio should be 25% and 75% splitting of the data to the wireless device 140 between the first radio access network node 100a and the second radio access network node 100b. This approach can be more accurate compared to the traffic steering of the first embodiment.

According to a third embodiment the splitting of transmission of the flow of data to the first radio access network node 100a and the second radio access network node 100b is determined according to machine learning of the predicted traffic throughputs and the current and previous buffer lengths of the wireless device 140. In more detail, according to this third embodiment, a supervised machine learning approach can be used. With machine learning mechanisms, more optimal splitting of the transmission of the flow of data destined for the wireless device 140 can be determined as compared to the traffic steering of the first embodiment and the second embodiment. Also, a machine learning mechanism could prevent a constantly erroneous prediction at the traffic throughput prediction module 200b.

When using a supervised machine learning mechanism, samples with ground truth need to be constructed for model training. According to an embodiment, the traffic steering module 200a is configured to construct these training samples.

Each sample may comprise traffic throughput predictions for the wireless device 140 from the traffic throughput prediction modules 200b of the radio access network nodes 110a, 110b serving the wireless device 140. Further, the buffer lengths of the radio access network nodes 110a, 100b serving the wireless device 140 can additionally be used. Additionally, each sample may comprise any of the above defined set of properties and historical values thereof. The ground truth for each sample defines the optimal traffic splitting ratio for the at least two radio access network nodes 110a, 110b serving the wireless device 140.

A non-limiting an illustrating numerical example of how the ground truth can be constructed will be disclosed next. Consider the illustrative numerical example of Table 1. Initially, the queue length for the wireless device 140 at the first radio access network node 100a (denoted RANN1) is 0.5 Mbit, and queue length at the second radio access network node 100b (denoted RANN2) is 0.2 Mbit. The traffic throughput of the wireless device 140 is predicted to 3 Mbit/s and 1.2 Mbit/s, respectively. Initially, at time t=0, assume that the traffic steering module 200a determines to split the flow of data destined for the wireless device 140 in a non-optimal manner, such as 2 Mbit/s to each of the first radio access network node 100a and the second radio access network node 100b. After one second (at time t=1), the respective queue lengths at the first radio access network node 110a and the second radio access network node 100b are 0 Mbit and 1.2 Mbit, respectively. From these numbers, the traffic steering module 200a can determine the ground truth traffic throughput for the first radio access network node 100a as at least 0.5 Mbit/s+2 Mbit/s=2.5 Mbit/s, as the first radio access network node 110a emptied the buffer for wireless device 140. In this case, the traffic steering module 200a can trust the predicted traffic throughput so that the ground truth for the first radio access network node 100a is 3 Mbit/s. For the second radio access network node 100b, the ground truth throughput is 0.2 Mbit/s+2 Mbit/s−1.2 Mbit/s=1 Mbit/s, which is lower than the predicted traffic throughput. When using these ground truth traffic throughputs, the traffic steering module 200a can determine the optimal traffic steering to be 3/(3+1)=75% of the data in the flow of data to be forwarded to the first radio access network node 110a whilst the remaining 25% of the data in the flow of data is to be forwarded to the second radio access network node 110b.

A training sample with a set of properties and ground truth can now be constructed. The set of properties include the queue length at time t=0 for the two radio access network nodes, 110a, 110b, and the predicted traffic throughput at the two radio access network nodes, 110a, 110b. The ground truth is that 75% of the flow of data destined for the wireless device 140 should be forwarded to the first radio access network node 110a.

TABLE 1

Illustrative numerical example of traffic steering.

| | Queue length at time t = 0 [Mbit] | Predicted throughput [Mbit/s] | Traffic sent [Mbit] | Queue length at time t = 1 [Mbit] | Ground truth throughput [Mbit/s] | Optimal traffic steering [%] |
|---|---|---|---|---|---|---|
| RANN$_1$ | 0.5 | 3 | 2 | 0 | ≥2.5 (3) | 75 |
| RANN$_2$ | 0.2 | 1.2 | 2 | 1.2 | 1 | 25 |

Above it has been disclosed how to obtain samples for machine learning. In the above illustrative example summarized in Table 1 a single sample was constructed. This single samples is denoted Sample 1 in Table 2.

In Table 2 each sample is a training sample indicating the optimal traffic splitting in three different scenarios (given by Sample 1, Sample 2, and Sample 3, respectively).

As an example, for Sample 1, the optimal splitting decision is to steer 75% of the flow of data destined for the wireless device 140 to the first radio access network node 110a (RANN1) when the traffic throughput for the radio access network nodes 110a, 110b (RANN1 and RANN2) is 3 Mbit/s and 1.2 Mbit/s, respectively, and the queue length is 0.5 Mbit and 0.2 Mbit, respectively.

As for Sample 2, both radio access network nodes 110a, 100b have a predicted traffic throughput of 3 Mbit/s, and none of the radio access network nodes 110a, 110b have a any buffered data (i.e., the queue length is zero). In this scenario the optimal splitting is 50%/50%.

As for Sample 3, this represents a scenario where both radio access network nodes 110a, 110b have a predicted traffic throughput of 5 Mbit/s, and where the first radio access network node 110a has a 1 Mbit buffer. In this scenario the optimal splitting is 40%/60%.

TABLE 2

Illustrative numerical example of machine learning.

| | Queue length at RANN1 [Mbit] | Predicted throughput at RANN1 [Mbit/s] | Queue length at RANN1 [Mbit] | Predicted throughput at RANN2 [Mbit/s] | Optimal traffic steering [%/%] |
|---|---|---|---|---|---|
| Sample 1 | 0.5 | 3 | 0.2 | 1.2 | 75/25 |
| Sample 2 | 0 | 3 | 0 | 3 | 50/50 |
| Sample 3 | 1 | 5 | 0 | 5 | 40/60 |

After collecting a large set of samples with input features and ground truth, machine learning is used to find a mapping between the input features and the ground truth. This mapping is called a model. The model could be based on machine learning techniques such as logistic regression, decision trees, random forest, neural networks, or support vector machines.

In general terms, the predication is based on previous history; if values of exactly the same properties as in the training samples are used as input to the prediction, the splitting will be based on the split ratio in the training sample. However, since the values of other properties than those in the training samples can be used as input to the prediction, the model may perform interpolation in order to determine the optimal splitting. However, how to exactly determine the model is out of scope of the present inventive concept.

FIG. 2a schematically illustrates, in terms of a number of functional units, the components of a system 200, 200a, 200b, 200c according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the system 200, 200a, 200b, 200c perform a set of operations, or steps, S102-S110, as disclosed above. For example, the storage medium 230 may store the set of operations, and the processing circuitry 210 may be configured to retrieve the set of operations from the storage medium 230 to cause the system 200, 200a, 200b, 200c to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The system 200, 200a, 200b, 200c may further comprise a communications interface 220. As such the communications interface 220 may comprise one or more transmitters and receivers, comprising analogue and digital components. The processing circuitry 210 controls the general operation of the system 200, 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the system 200, 200a, 200b, 200c are omitted in order not to obscure the concepts presented herein.

FIG. 2b schematically illustrates, in terms of a number of functional modules, the components of a system 200, 200a, 200b, 200c according to an embodiment. The system 200, 200a, 200b, 200C of FIG. 2b comprises a number of functional modules; a first obtain module 210a configured to perform step S102, a determine module 210b configured to perform step S108, and an initiate module 210C configured to perform step S110. The system 200, 200a, 200b, 200C of FIG. 2b may further comprises a number of optional functional modules, such as any of a machine learner module 210d configured to perform step S102a, a second obtain module 210e configured to perform step S104, a third obtain module 210f configured to perform step S106, a first provide module 210g configured to perform step S100a, and a second provide module 210h configured to perform step S100b. Although three different obtain modules 210a, 210e, 210f are disclosed, the three obtain modules 210a, 210e, 210f may be arranged as one single obtain module. Although two different provide modules 210g, 210h are disclosed, the two provide modules 210g, 210h may be arranged as one single provide module.

The first obtain module 210a may comprise instructions that when executed by the system 200, 200a, 200b, 200c causes the processing circuitry 210, possibly in conjunction with the communications interface 220 and the storage medium, to predict traffic throughput for the wireless device 140 for each of the first radio access network node 100a and the second radio access network node 110b in order for the system 200, 200a, 200b, 200c to perform above step S102.

The machine learner module 210d may comprise instructions that when executed by the system 200, 200a, 200b, 200c causes the processing circuitry 210, possibly in conjunction with the communications interface 220 and the storage medium, to perform machine learning on a set of properties and the values thereof in order to obtain the predicted traffic throughputs in order for the system 200, 200a, 200b, 200c perform above step S102a.

The second obtain module 210e may comprise instructions that when executed by the system 200, 200a, 200b, 200c causes the processing circuitry 210, possibly in conjunction with the communications interface 220 and the storage medium, to obtain at least one of a predicted radio quality of the wireless device 140 and predicted cell load from each of the first radio access network node 100a and the second radio access network node 100b in order for the system 200, 200a, 200b, 200c perform above step S104.

The third obtain module 210f may comprise instructions that when executed by the system 200, 200a, 200b, 200c causes the processing circuitry 210, possibly in conjunction with the communications interface 220 and the storage medium, to obtain a respective buffer length report for the wireless device 140 from each of the first radio access network node 110a and the second radio access network node 100b in order for the system 200, 200a, 200b, 200c to perform above step S106.

The determine module 210d may comprise instructions that when executed by the system 200, 200a, 200b, 200c causes the processing circuitry 210, possibly in conjunction with the communications interface 220 and the storage medium, to determine splitting of transmission of the flow of data destined for the wireless device 140 between the first radio access network node 100a and the second radio access network node 100b according to the obtained predicted traffic throughputsin order for the system 200, 200a, 200b, 200c to perform above step S108.

The initiate module 210c may comprise instructions that when executed by the system 200, 200a, 200b, 200c causes the processing circuitry 210, possibly in conjunction with the communications interface 220 and the storage medium, to initiate traffic steering of the flow of data between the first radio access network node 100a and the second radio access network node 100b according to the splitting in order for the system 200, 200a, 200b, 200c perform above step S110a.

The first provide module 210g may comprise instructions that when executed by the system 200, 200a, 200b, 200c causes the processing circuitry 210, possibly in conjunction with the communications interface 220 and the storage medium, to provide the splitting of transmission of the flow of data to a serving gateway 130 of the wireless device 140 when initiating traffic steering of the flow of data in order for the system 200, 200a, 200b, 200c perform above step S110a.

The second provide module 210h may comprise instructions that when executed by the system 200, 200a, 200b, 200c causes the processing circuitry 210, possibly in conjunction with the communications interface 220 and the storage medium, to provide the splitting of transmission of the flow of data to a serving network node 120a of the wireless device 140 when initiating traffic steering of the flow of data in order for the system 200, 200a, 200b, 200c perform above step S110b.

In general terms, each functional module 210a-210h may in one embodiment be implemented only in hardware or and in another embodiment with the help of software, i.e., the latter embodiment having computer program instructions stored on the storage medium 230 which when run on the processing circuitry makes the system 200, 200a, 200b, 200c perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with functional units 220 and/or 230. The processing circuitry 210 may thus be configured to from the storage medium 230 fetch instructions as provided by a functional module 210a-210h and to execute these instructions, thereby performing any steps as will be disclosed hereinafter.

A first portion of the instructions performed by the system 200, 200a, 200b, 200c may be executed in a first device, and a second portion of the of the instructions performed by the system 200, 200a, 200b, 200c may be executed in a second device; the herein disclosed embodiments are not limited to any particular number of devices on which the instructions performed by the system 200, 200a, 200b, 200c may be executed. Hence, the methods according to the herein disclosed embodiments are suitable to be performed by a system 200, 200a, 200b, 200c residing in a cloud computational environment. Therefore, although a single processing circuitry 210 is illustrated in FIG. 2a the processing circuitry 210 may be distributed among a plurality of devices, or nodes. The same applies to the functional modules 210a-210h of FIG. 2b and the computer program 320 of FIG. 3 (see below).

FIG. 3 shows one example of a computer program product 310 comprising computer readable storage medium 330o. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A system for traffic steering between a first radio access network node and a second radio access network node, the system comprising processing circuitry and a storage medium comprising a computer program, storing instructions that, when executed by the processing circuitry, cause the system to:

obtain, for each of the first radio access network node and the second radio access network node, a respective predicted traffic throughput for a wireless device, the wireless device being in dual connectivity with the first radio access network node and the second radio access network node;

obtain a respective buffer length report for the wireless device from each of the first radio access network node and the second radio access network node;

determine splitting of transmission of a flow of data destined for the wireless device between the first radio access network node and the second radio access network node according to the obtained predicted traffic throughputs, wherein the splitting of transmission of the flow of data is determined according to the obtained buffer length reports in addition to the obtained predicted traffic throughputs; and initiate traffic steering of the flow of data between the first radio access network node and the second radio access network node according to the splitting, wherein the system is caused to determine that the splitting of transmission of the flow of data to the first radio access network node and the second radio access network node is made according to the obtained buffer length reports such that buffers at the first radio access network node and the second radio access network node for transmitting the flow of data destined for the wireless device empty within a predetermined time period from each other.

2. The system according to claim 1, wherein the predicted traffic throughput for the wireless device from one of the first radio access network node and the second radio access network node represents amount of transmission resources to be made available to the wireless device from this one of the first radio access network node and the second radio access network node.

3. The system according to claim 1, wherein the system is caused to obtain the predicted traffic throughputs from respective measures of current traffic throughputs at the first radio access network node and the second radio access network node.

4. The system according to claim 1, wherein the system is caused to associate each predicted traffic throughput with a duration in time, and wherein the predicted traffic throughputs are obtainable for time periods having at least two different durations in time.

5. The system according to claim 1, wherein the system is caused to determine how often the system obtains the predicted traffic throughput is dependent on a change of rate of traffic throughput between a first occurrence of obtained predicted traffic throughputs and a second occurrence of obtained predicted traffic throughputs.

6. The system according to claim 1, wherein the system is caused to predict traffic throughput for the wireless device based on a set of properties and historical values thereof obtained by the first radio access network node and the second radio access network node.

7. The system according to claim 6, wherein the set of properties comprises at least one of: total number of wireless devices served by the first radio access network node and the second radio access network node, number of active wireless devices served by the first radio access network node and the second radio access network node, channel quality information of each wireless devices served by the first radio access network node and the second radio access network node, antenna rank of each wireless device served by the first radio access network node and the second radio access network node, wireless device throughput of the first radio access network node and the second radio access network node, cell load of the first radio access network node and the second radio access network node, number of used frequency sub-bands at the first radio access network node and the second radio access network node, and frequency of scheduling for each wireless device served by the first radio access network node and the second radio access network node.

8. The system according to claim 6, wherein the system is further caused to:
perform machine learning on the set of properties and the values thereof in order to obtain the predicted traffic throughputs.

9. The system according to claim 1, wherein the system is further caused to:
obtain at least one of a predicted radio quality of the wireless device and predicted cell load from each of the first radio access network node and the second radio access network node, and
wherein the splitting of transmission of the flow of data is determined according to at least one of the obtained predicted radio quality and predicted cell load in addition to the obtained predicted traffic throughputs.

10. The system according to claim 1, wherein the system is caused to provide buffer length reports indicating current and previous buffer lengths of the wireless device.

11. The system according to claim 1, wherein the system is caused to determine that the splitting of transmission of the flow of data to the first radio access network node and the second radio access network node is proportional to the obtained predicted traffic throughputs for the first radio access network node and the second radio access network node.

12. The system according to claim 1, wherein the system is caused to determine that the splitting of transmission of the flow of data to the first radio access network node and the second radio access network node is made according to machine learning of the predicted traffic throughputs and the current and previous buffer lengths of the wireless device.

13. The system according to claim 1, wherein the data destined for the wireless device represents packet data convergence protocol, PDCP, packet data units, PDUs.

14. The system according to claim 1, wherein each of the first radio access network node and the second radio access network node of the system is caused to use its own frequency carrier.

15. The system according to claim 1, wherein the system is further caused to:
provide the splitting of transmission of the flow of data to a serving gateway of the wireless device when initiating traffic steering of the flow of data.

16. The system according to claim 1, wherein the system is further caused to:
provide the splitting of transmission of the flow of data to a serving network node of the wireless device when initiating traffic steering of the flow of data.

17. A method for traffic steering between a first radio access network node and a second radio access network node, the method being performed by a system, the method comprising:
obtaining, for each of the first radio access network node and the second radio access network node, a respective predicted traffic throughput for a wireless device, the wireless device being in dual connectivity with the first radio access network node and the second radio access network node;
obtaining a respective buffer length report for the wireless device from each of the first radio access network node and the second radio access network node;
determining splitting of transmission of a flow of data destined for the wireless device between the first radio access network node and the second radio access network node according to the obtained predicted traffic throughputs, wherein the splitting of transmission of the flow of data is determined according to the obtained buffer length reports in addition to the obtained predicted traffic throughputs; and
initiating traffic steering of the flow of data between the first radio access network node and the second radio access network node according to the splitting,
wherein determining that the splitting of transmission of the flow of data to the first radio access network node and the second radio access network node is made according to the obtained buffer length reports such that buffers at the first radio access network node and the second radio access network node for transmitting the flow of data destined for the wireless device empty within a predetermined time period from each other.

18. A non-transitory computer storage medium storing a computer program for traffic steering between a first radio access network node and a second radio access network node, the computer program comprising computer code which, when run on processing circuitry of a system, causes the system to:

obtain, for each of the first radio access network node and the second radio access network node, a respective predicted traffic throughput for a wireless device, the wireless device being in dual connectivity with the first radio access network node and the second radio access network node;

obtain a respective buffer length report for the wireless device from each of the first radio access network node and the second radio access network node;

determine splitting of transmission of a flow of data destined for the wireless device between the first radio access network node and the second radio access network node according to the obtained predicted traffic throughputs, wherein the splitting of transmission of the flow of data is determined according to the obtained buffer length reports in addition to the obtained predicted traffic throughputs; and initiate traffic steering of the flow of data between the first radio access network node and the second radio access network node according to the splitting, wherein determination of the splitting of transmission of the flow of data to the first radio access network node and the second radio access network node is made according to the obtained buffer length reports such that buffers at the first radio access network node and the second radio access network node for transmitting the flow of data destined for the wireless device empty within a predetermined time period from each other.

* * * * *